US010798026B2

(12) United States Patent
Dhanabalan et al.

(10) Patent No.: US 10,798,026 B2
(45) Date of Patent: Oct. 6, 2020

(54) BUFFERBLOAT RECOVERY AND AVOIDANCE SYSTEMS AND METHODS

(71) Applicant: Citrix Systems, Inc., Fort Lauderdale, FL (US)

(72) Inventors: Praveen Raja Dhanabalan, Bengaluru (IN); Surya Prakash Patel, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 13 days.

(21) Appl. No.: 16/027,481

(22) Filed: Jul. 5, 2018

(65) Prior Publication Data

US 2020/0014639 A1    Jan. 9, 2020

(51) Int. Cl.
| | | |
|---|---|---|
| *H04L 12/861* | (2013.01) | |
| *H04L 12/931* | (2013.01) | |
| *H04L 12/26* | (2006.01) | |

(52) U.S. Cl.
CPC ........ *H04L 49/9084* (2013.01); *H04L 49/501* (2013.01); *H04L 49/505* (2013.01); *H04L 43/16* (2013.01); *H04L 49/9005* (2013.01)

(58) Field of Classification Search
CPC ..... G06F 9/544; G06F 13/18; H04N 21/4392; H04W 28/0278; H04W 28/0289; H04L 47/6255; H04L 47/32; H04L 47/30; H04L 49/501; H04L 49/505; H04L 49/9005; H04L 49/9084; H04L 69/04
See application file for complete search history.

(56) References Cited

U.S. PATENT DOCUMENTS

| | | | |
|---|---|---|---|
| 7,003,597 | B2 * | 2/2006 | Georgiou et al. |
| 7,596,488 | B2 * | 9/2009 | Florencio et al. |
| 10,270,703 | B2 * | 4/2019 | Hammarqvist |
| 2008/0228939 | A1 * | 9/2008 | Samuels et al. |
| 2009/0161547 | A1 * | 6/2009 | Riddle et al. |

* cited by examiner

*Primary Examiner* — Marsha D Banks Harold
*Assistant Examiner* — Dharmesh J Patel
(74) *Attorney, Agent, or Firm* — Foley & Lardner LLP

(57) ABSTRACT

Systems and methods for bufferbloat recovery and avoidance are provided herein. A portion of the buffer can be compressed based on one or more thresholds without changing an order of packet transmission and without dropping packets. The method includes storing, by a device, a plurality of packets received by the device to a buffer. The buffer can be configured with a minimum threshold and a maximum threshold. The method includes detecting that a size of the buffer has reached at least the maximum threshold and compressing one or more packets of the plurality of packets stored between the minimum threshold and the maximum threshold while transmitting, during compression, at least a portion of one or more packets of the plurality of packets stored in the buffer below the minimum threshold.

20 Claims, 11 Drawing Sheets

BUFFERBLOAT RECOVERY AND AVOIDANCE SYSTEMS AND METHODS

BACKGROUND

In computer networks, bufferbloat can cause latency issues in packet-switched networks by excess buffering of packets. Techniques such as random early detection can be used to avoid bufferbloat by randomly dropping packets such as when a buffer is full or congested. However, these random packet drops can impact performance and user experience.

SUMMARY

This Summary is provided to introduce a selection of concepts in a simplified form that are further described below in the Detailed Description. This Summary is not intended to identify key features or essential features, nor is it intended to limit the scope of the claims included herewith.

Systems and methods for bufferbloat recovery and avoidance are provided herein. An intermediary device is disposed within a network environment between one or more clients and one or more resource servers and can include a buffer for routing or transmitting data or packets between the clients and servers within the network environment. A portion of the buffer can be compressed based on one or more thresholds without changing an order of packet transmission and without dropping packets. For example, one or more packets can be stored in the buffer in a predetermined order. Threshold values can be established for the buffer including a maximum threshold and a minimum threshold. When a size of the buffer crosses the maximum threshold, a portion of the buffer can be selected for compression. The selected portion can correspond to the packets stored between the maximum threshold and the minimum threshold.

The selected portion of the buffer can be reduced by a compression ratio to generate a plurality of compressed packets. The compressed packets can be re-incorporated back into the buffer at a point corresponding to a difference between the minimum threshold and the compression time. Thus, the compressed packets can be re-incorporated back into the buffer at the point or location they would be if the packets hadn't been selected for compression and without modifying an order of the packets in the buffer, including the packets not selected for compression. A size of the buffer can be compressed or reduced without dropping or eliminating packets or packet portions. The device can continue to transmit, during compression, at least a portion of the buffer below the minimum threshold or otherwise not included in the selected portion. Thus, bufferbloat can be avoided without impacting performance and/or user experience.

A first aspect provides a method for compressing a portion of a buffer. The method includes storing, by a device, a plurality of packets received by the device to a buffer. The buffer configured with a minimum threshold and a maximum threshold. The method includes detecting that a size of the buffer has reached at least the maximum threshold and compressing one or more packets of the plurality of packets stored between the minimum threshold and the maximum threshold while transmitting, during compression, at least a portion of one or more packets of the plurality of packets stored in the buffer below the minimum threshold.

Another aspect provides a system for compressing a portion of a buffer. The system includes a device intermediary to a client and a server. The device is configured to store a plurality of packets received by the device to a buffer, the buffer configured with a minimum threshold and a maximum threshold, detect that a size of the buffer has reached at least the maximum threshold, and compress one or more packets of the plurality of packets stored between the minimum threshold and the maximum threshold while transmitting, during compression, at least a portion of one or more packets of the plurality of packets stored in the buffer below the minimum threshold.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for bufferbloat recovery and avoidance.

A. Network and Computing Environment

Figure 1A:
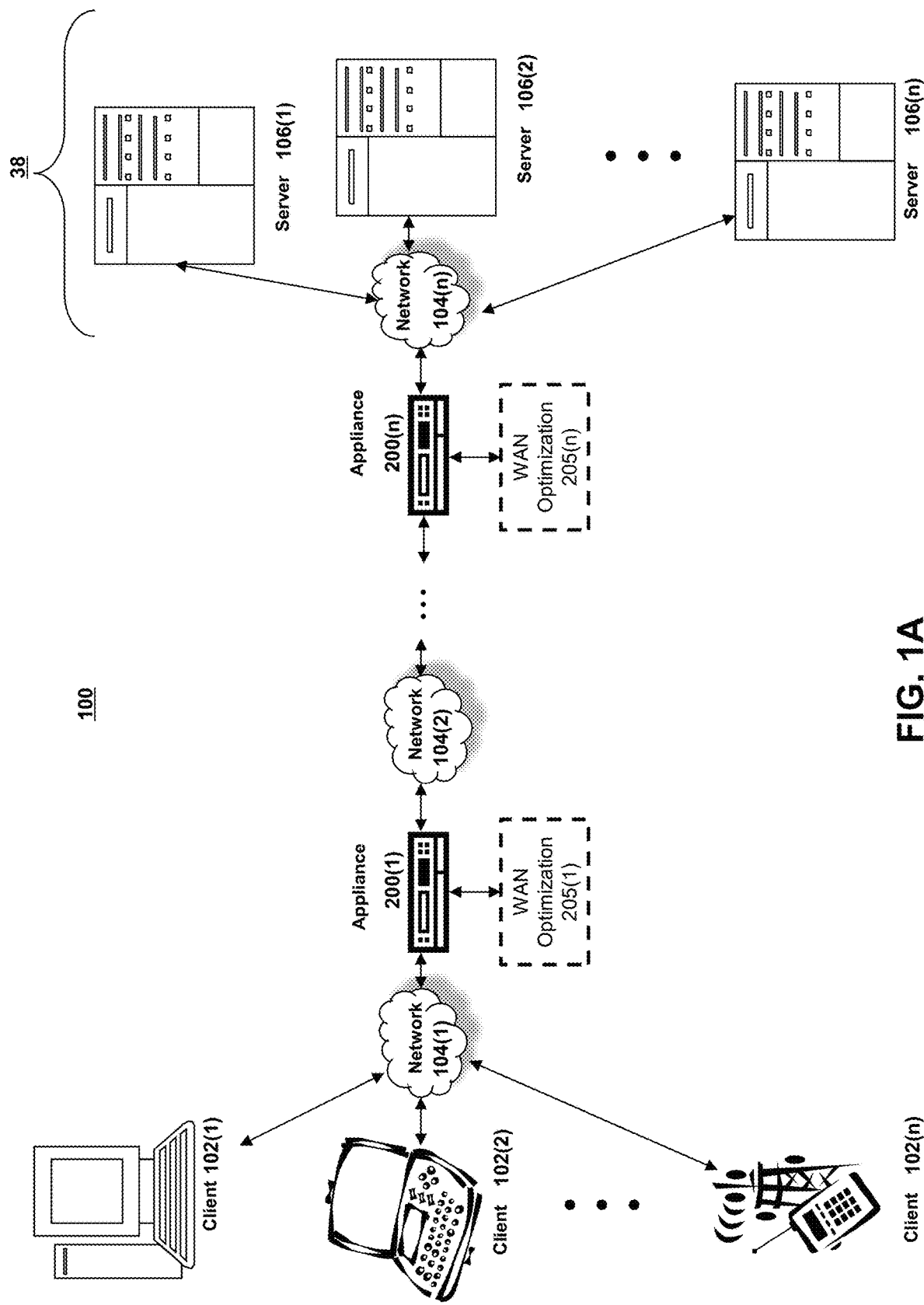
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
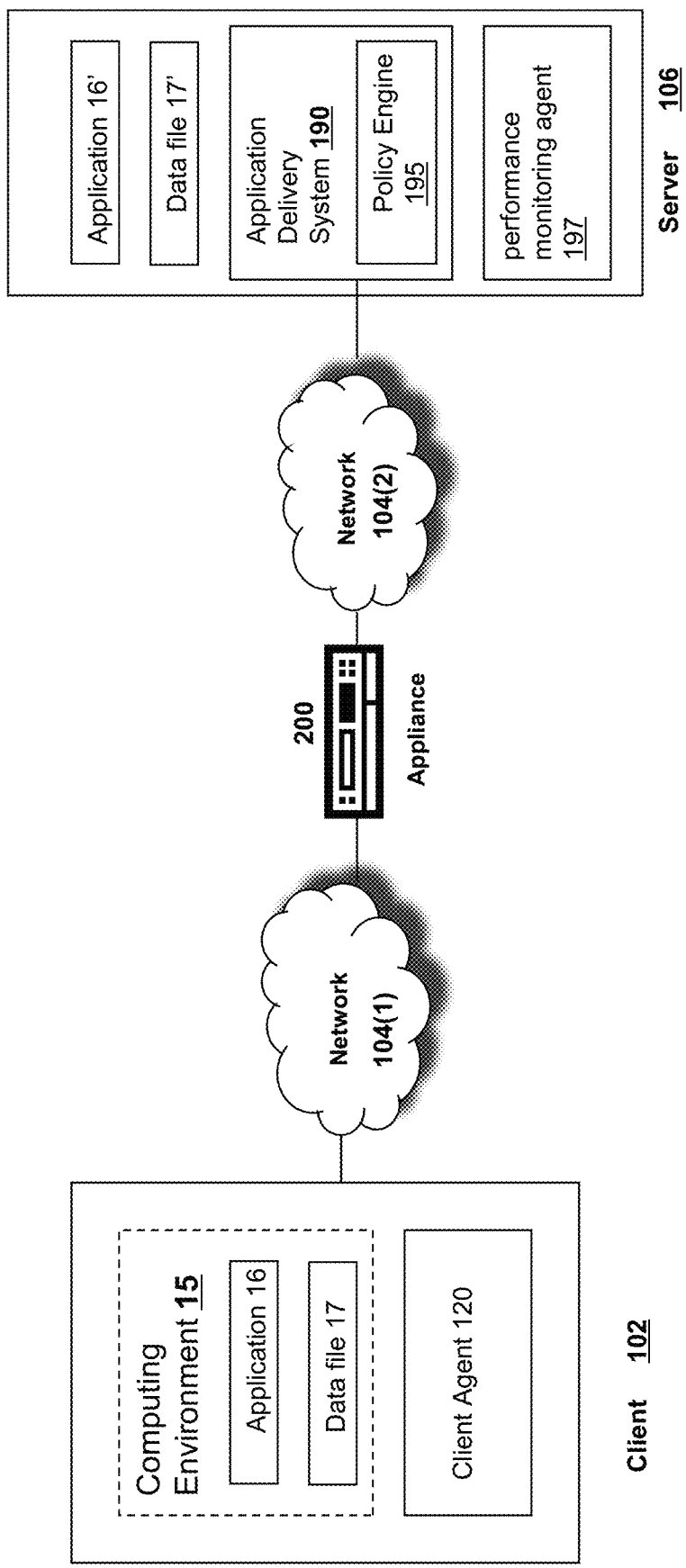
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 50 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 50), servers 106 (e.g., agent 197) or an appliances 200 and/or 205 (agent not shown). In general, monitoring agents (e.g., 50 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
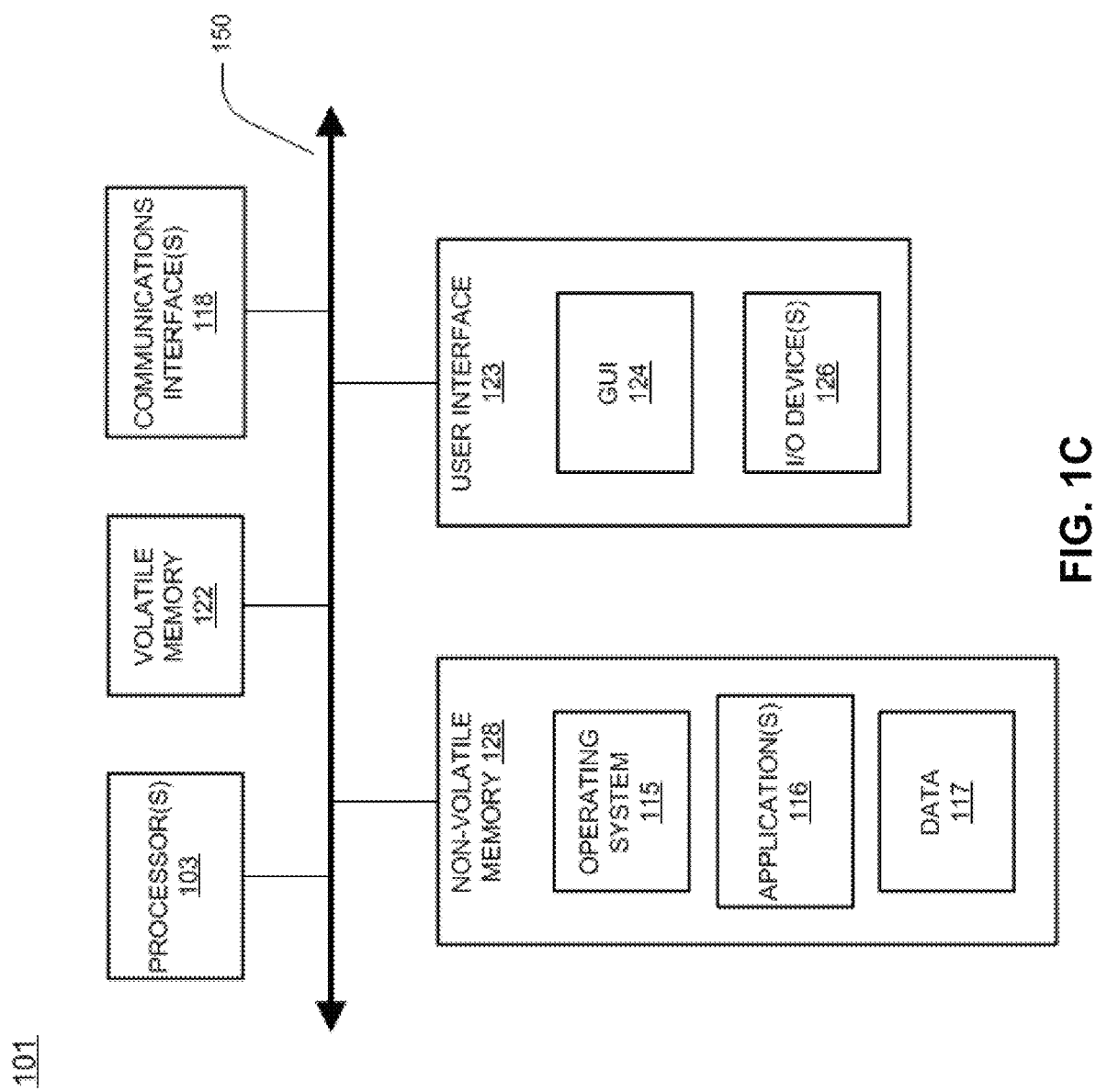
FIG. 1C is a block diagram of a computing device, in accordance with an illustrative embodiment.

As shown in FIG. 1C, computer 101 may include one or more processors 103, volatile memory 52 (e.g., RAM), non-volatile memory 58 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 53, one or more communications interfaces 118, and communication bus 150. User interface 53 may include graphical user interface (GUI) 54 (e.g., a touchscreen, a display, etc.) and one or more input/output (I/O) devices 56 (e.g., a mouse, a keyboard, etc.). Non-volatile memory 58 stores operating system 115, one or more applications 116, and data 117 such that, for example, computer instructions of operating system 115 and/or applications 116 are executed by processor(s) 103 out of volatile memory 52. Data may be entered using an input device of GUI 54 or received from I/O device(s) 56. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

Figure 2:
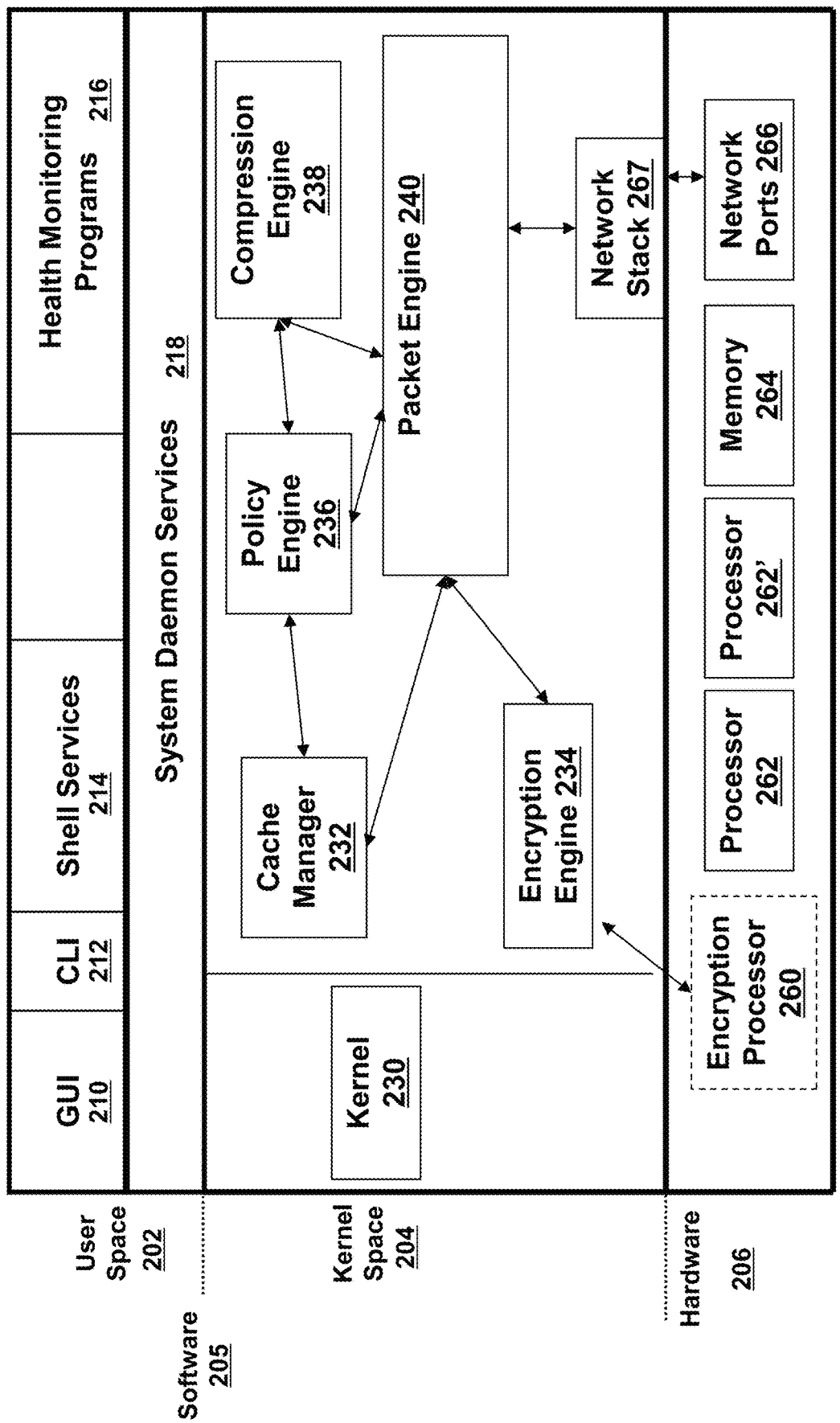
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 50 for establishing and exchanging communications with appliance 200 and/or server 106 via a network 104. Client 102 may have installed and/or execute one or more applications that are in communication with network 104. Client agent 50 may intercept network communications from a network stack used by the one or more applications. For example, client agent 50 may intercept a network communication at any point in a network stack and redirect the network communication to a destination desired, managed or controlled by client agent 50, for example to intercept and redirect a transport layer connection to an IP address and port controlled or managed by client agent 50. Thus, client agent 50 may transparently intercept any protocol layer below the transport layer, such as the network layer, and any protocol layer above the transport layer, such as the session, presentation or application layers. Client agent 50 can interface with the transport layer to secure, optimize, accelerate, route or load-balance any communications provided via any protocol carried by the transport layer.

In some embodiments, client agent 50 is implemented as an Independent Computing Architecture (ICA) client developed by Citrix Systems, Inc. of Fort Lauderdale, Fla. Client agent 50 may perform acceleration, streaming, monitoring, and/or other operations. For example, client agent 50 may accelerate streaming an application from a server 106 to a client 102. Client agent 50 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 50 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

Figure 3:
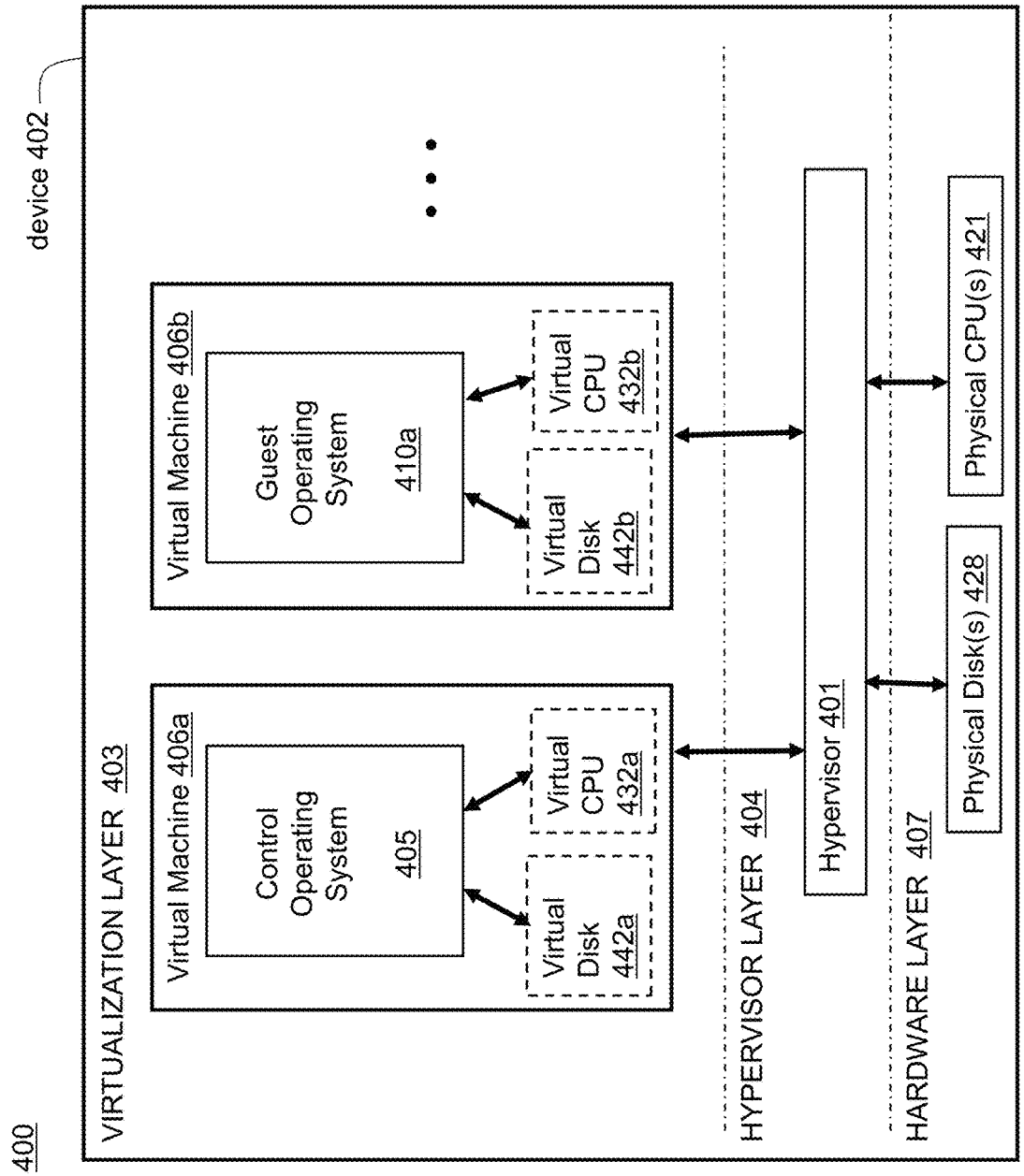
FIG. 3 is a block diagram of a virtualization environment, in accordance with an illustrative embodiment.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

Figure 4:
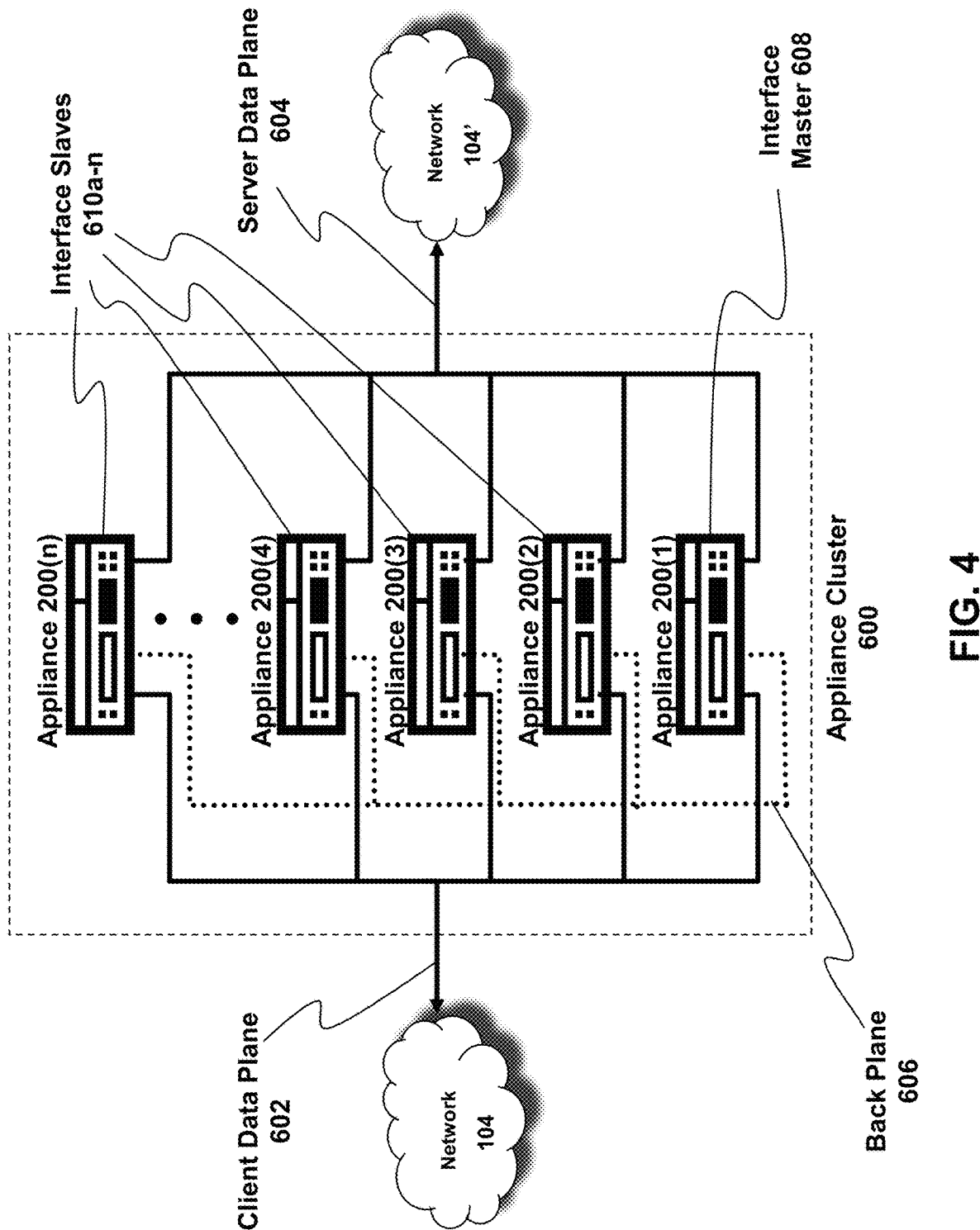
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

B. Bufferbloat Recovery and Avoidance

Systems and methods for bufferbloat recovery and avoidance are provided herein. A device intermediary to one or more clients and one or more servers can be disposed within a network environment and direct, forward, and/or transmit packets between the clients, servers, or other forms of computing devices within the network environment. The device can compress a portion of a buffer using one or more thresholds without impacting the order of packet transmission and without dropping packets.

For example, the device includes a memory having a data buffer (or more simply buffer) used to store data while the data is being transmitted between different computing devices. The buffer can have a maximum threshold corresponding to a first time value and a minimum threshold corresponding to a second, different time value. When the buffer size reaches, crosses, or is greater than the maximum threshold, the device can compress packets between the maximum threshold and the minimum threshold in an order they were received.

The device can execute a compression algorithm to compress the selected packets and compress the selected packets by a predetermined ratio. The predetermined ratio can be selected based at least in part on a difference between the maximum threshold and the minimum threshold and a difference between the minimum threshold and a compression time to compress the packets.

The compressed packets can be combined or added back to the buffer at a predetermined point corresponding to a difference between the minimum threshold and the compression time (e.g., min threshold−compression time). Thus, the buffer size can be reduced by the predetermined ratio without dropping any packets. Further, a second device can decompress the packets in the same order, thus maintaining the original order that the packets were received at the first device.

Referring now to FIG. 5, a network environment 500 is provided having an intermediary device 200 (also referred to herein as "device") in communication with at least one client device of a plurality of client devices 102a-102n, through a first network 104 and in communication with at least one server of a plurality of servers 106a-106n, through a second network 104". The device 200 can be configured to provide bufferbloat recovery and avoidance for one or more client devices 102 of the plurality of client devices 102a-102n and/or one or more servers 106 of the plurality of servers 106a-106n.

The device 200 includes a processor 502, a compression module 504, a compression algorithm 506, a memory 510, and a buffer 512. The memory 510 may include multiple buffers 512. The processor 502 can include non-volatile memory that stores computer instructions and an operating system. For example, the computer instructions can be executed by the processor 502 out of volatile memory to perform all or part of the method 600.

The device 200 can include or execute the compression algorithm 506 to compress one or more packets stored in a queue of a buffer 512 using one or more thresholds. The buffer 512 can be stored on the device or on a computing device, such as but not limited to a database, coupled with the device 200. The compression algorithm 506 can compress the buffer 512 by a predetermined ratio (also referred to herein as a compression ratio) without altering or changing an order of the one or more packets in the buffer 512. The device 200 can reduce a size of the buffer 512 corresponding to the compression ratio without dropping a packet or portions of a packet. By reducing the buffer size, the device 200 can reduce inbound latency to improve performance of a connection between the device 200 and one or more client devices 102 of the plurality of client devices 102a-102n and/or one or more servers 106 of the plurality of servers 106a-106n.

The compression module 504 can include one or more compression algorithms 506 and/or one or more decompression algorithms. The compression algorithm can include various types of compression algorithms, such as but not limited to, symmetric algorithms. The compression module 504 can execute the compression algorithms 506 to reduce a total size of portions or one or more packets and/or reduce a total size of portions of one or more buffers 512. The compression module 504 can be the same as or similar to the compression engine 238 described above with respect to FIG. 2. For example, the compression module 504 can compress packets 550a-550n bi-directionally between the client devices 102a-102n and servers 106a-106n.

The memory 510 can include any device capable of storing information temporarily or permanently. The memory 510 may include one or more databases for organizing and storing data. Memory 510 can be the same as or substantially similar to volatile memory 52 and/or non-volatile memory 58 described above with respect to FIG. 1C or memory 264 described above with respect to FIG. 2.

The memory 510 can include one or more buffers 512. The buffer 512 can correspond to a data buffer or a region of memory for storing data (e.g., temporarily storing data) as the data is moved, directed or transmitted between different locations or computing devices.

The client devices 102a-102n can be the same as or substantially similar to at least one of clients 102(1)-102n of FIG. 1A or client 102 of FIG. 1B. The servers 106a-106n can be the same as or substantially similar to servers 106(1)-106n of FIG. 1A and server 106 of FIG. 1B. For example, the servers 106a-106n may include an application delivery system for delivering a computing environment, application, and/or data files to client devices 102a-102n.

Figure 5A:
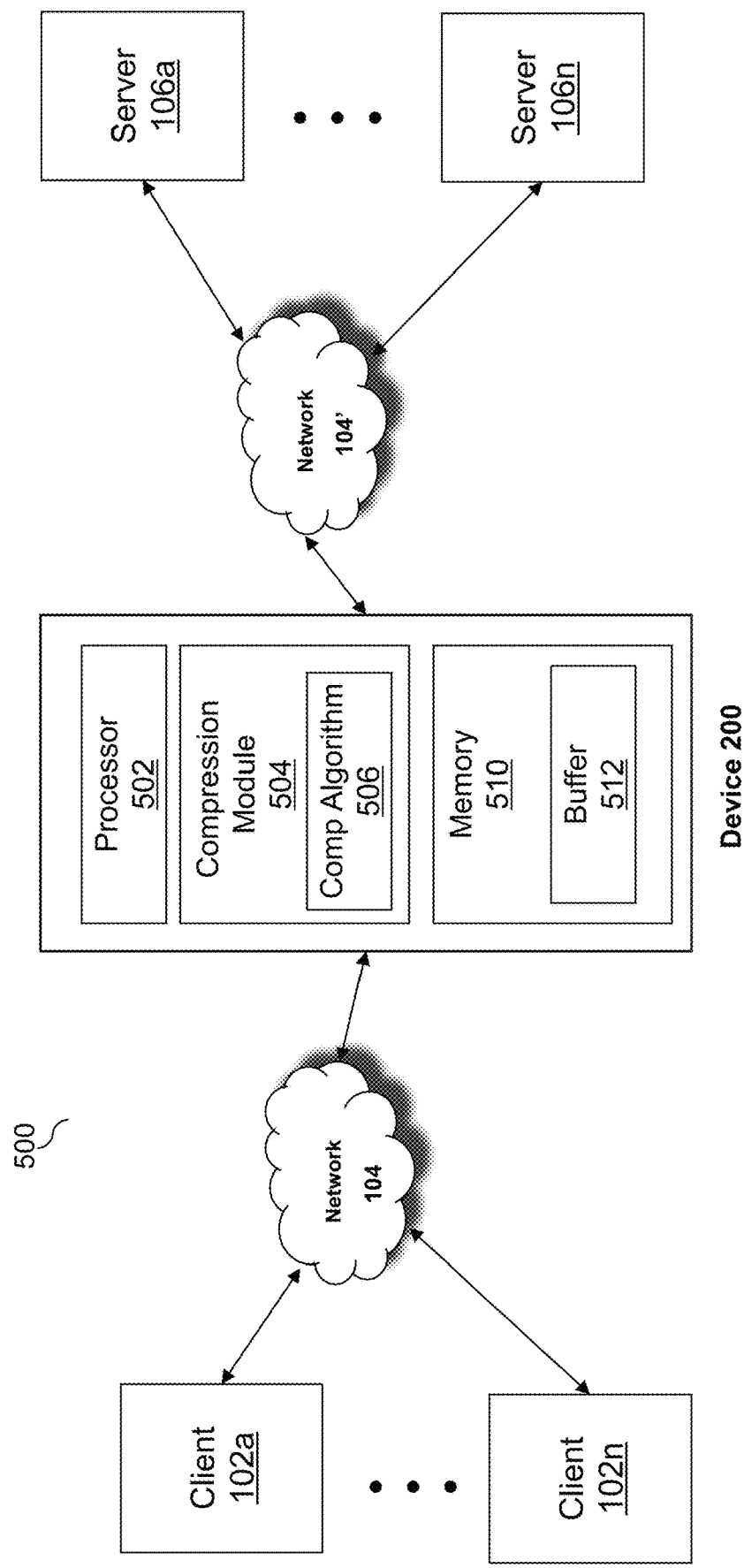
FIG. 5A is a block diagram of a system for bufferbloat recovery and avoidance.
Figure 5B:
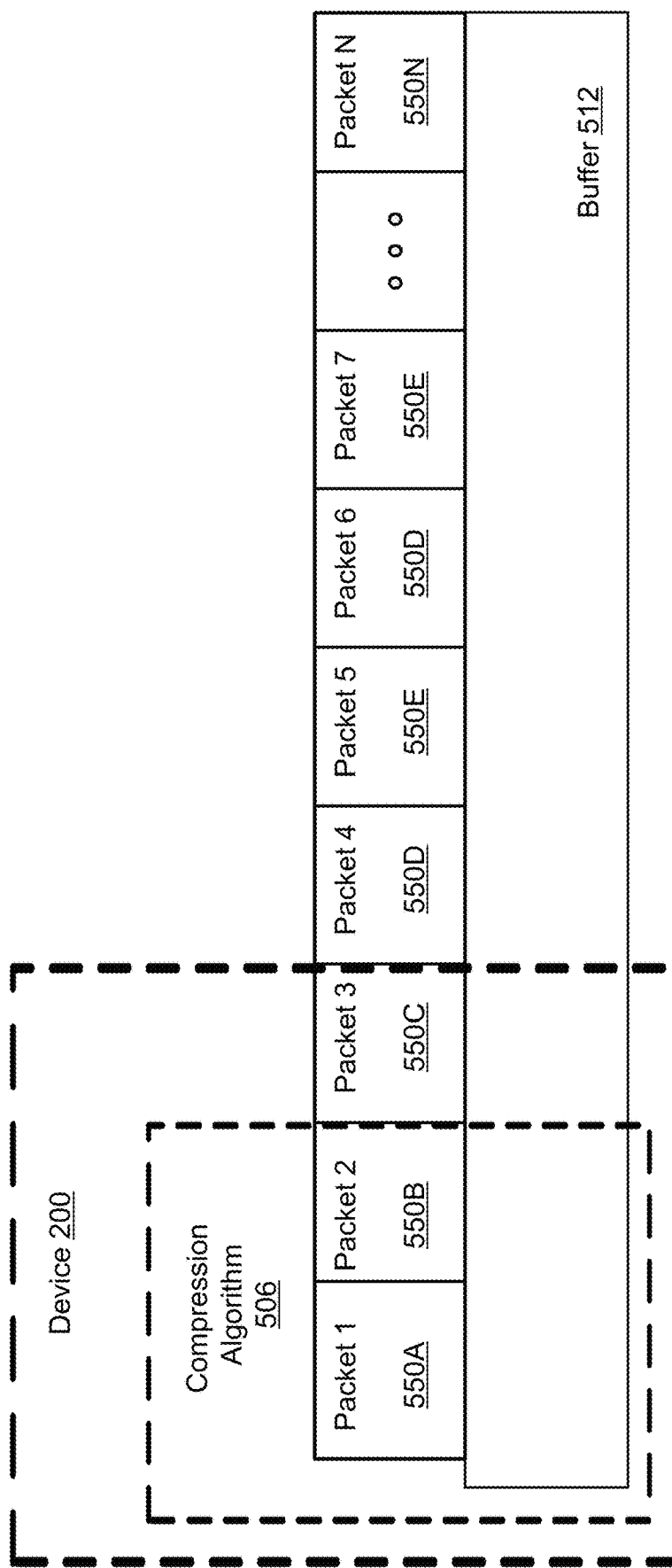
FIG. 5B is a first schematic illustrating a buffer and a compression algorithm.

Referring now to FIG. 5B, the buffer 512 can include or store a plurality of packets 550a-550n received by the device 200. The buffer 512 can be configured for queueing the packets 550a-550n for transmission by device 200. The packets 550a-550n may include data packets or network packets. Each of the packets 550a-550n may include a header portion, field portion, and/or payload portion. As will be described in greater detail below with respect to FIG. 6, the device 200 (or compression module 504) can apply a compression algorithm 506 to one or more packets in the buffer 512 to compress the selected portion of the buffer by a compression ratio.

Figure 5C:
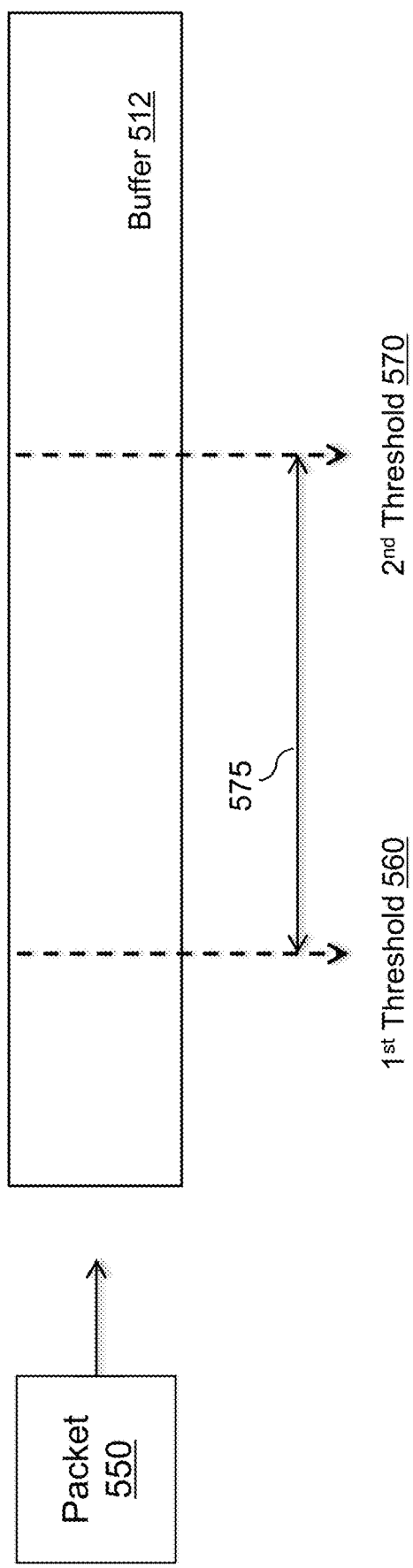
FIG. 5C is a second schematic illustrating a buffer having a maximum threshold and a minimum threshold.

Referring now to FIG. 5C, the buffer 512 can include one or more threshold values. For example, and as depicted in FIG. 5B, the buffer 512 can include a first threshold value 560 and a second threshold value 570. The first threshold value 560 can correspond to a maximum threshold and the second threshold value 570 can correspond to a minimum threshold. The threshold values 560, 570 can be selected based in part on a size of the buffer. For example, threshold values 560, 570 can be established such that they are between an upper limit or capacity of the buffer 512 and the lower limit or initial point of the buffer 512. The threshold values 560, 570 can be established by an administrator of the device 200.

In some embodiments, the threshold values 560, 570 can be established based in part on a size or portion of the buffer 512 to be compressed. For example, a difference 575 between the maximum threshold 560 and the minimum threshold 570 (e.g., max−min) corresponds to the portion of the buffer 512 selected for compression or selected portion 575. Thus, by increasing or decreasing the difference between the maximum threshold 560 and the minimum threshold 570, the selected portion 575 of the buffer 512 to be compressed can be modified.

The threshold values can include or correspond to time values or pointer values within the buffer 512. The number of threshold values can vary. In some embodiments, the buffer 512 can include one threshold value. In other embodiments, the buffer 512 can include more than two threshold values.

Figure 5D:
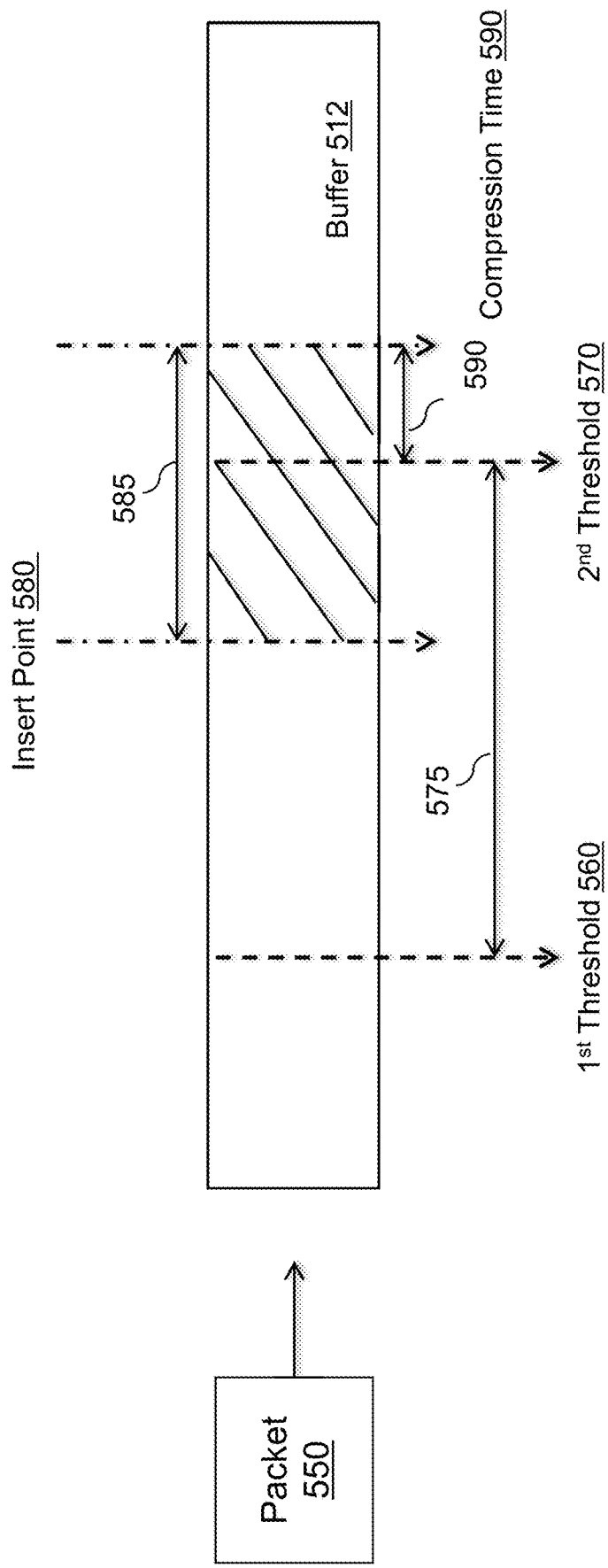
FIG. 5D is a third schematic illustrating compression of a buffer.

Referring now to FIG. 5D, the selected portion 575 can be compressed using the compression algorithm 506 to a compressed portion 585 and the compressed portion 585 can be inserted back into the buffer at a first point 580.

In one example embodiment, the maximum threshold 560 can be established as 50 milliseconds (ms) and the minimum threshold 570 can be established as 10 ms by the device 200 or an administrator of the device 200. When the buffer size reaches or crosses the maximum threshold 560 of 50 ms, the packets stored in the buffer 512 between the maximum threshold 560 (50 ms) and the minimum threshold 570 (10 ms) can be selected for compression. In the example embodiment, the size of the selected portion 575 corresponds to 40 ms (e.g., 50 ms−10 ms). Thus, 40 ms of packets can be transmitted or forwarded to the compression module 504 for compression using the compression algorithm 506. The compression module 504 can compress the selected portion 575 from 40 ms to a compressed portion 585 of 8 ms using a compression ratio of 5:1. The compression time 590 to execute the compression algorithm on the selected portion 585 can correspond to 2 ms. Thus, the compressed packets can be added or re-incorporated back into the buffer at a first point 580 corresponding to 8 ms or the minimum threshold 570 minus the compression time 590 (e.g., 10 ms−2 ms). The maximum threshold 560, minimum threshold 570, compression time 590, and/or compression ratio can vary outside the numbers provided above.

The queue in the buffer after the compression corresponds to 8 ms (e.g., packets before the compression time) plus the 8 ms of compressed packets in the compressed portion 585 (e.g., added at the first point in the buffer) plus any new packets that are added to the queue during the compression time, here 2 ms. Thus, the queue size can be reduced from 50 ms before the compression time (e.g., 2 ms) to 16 ms plus any new packets that are added to the queue during the compression time, here 2 ms.

Figure 6:
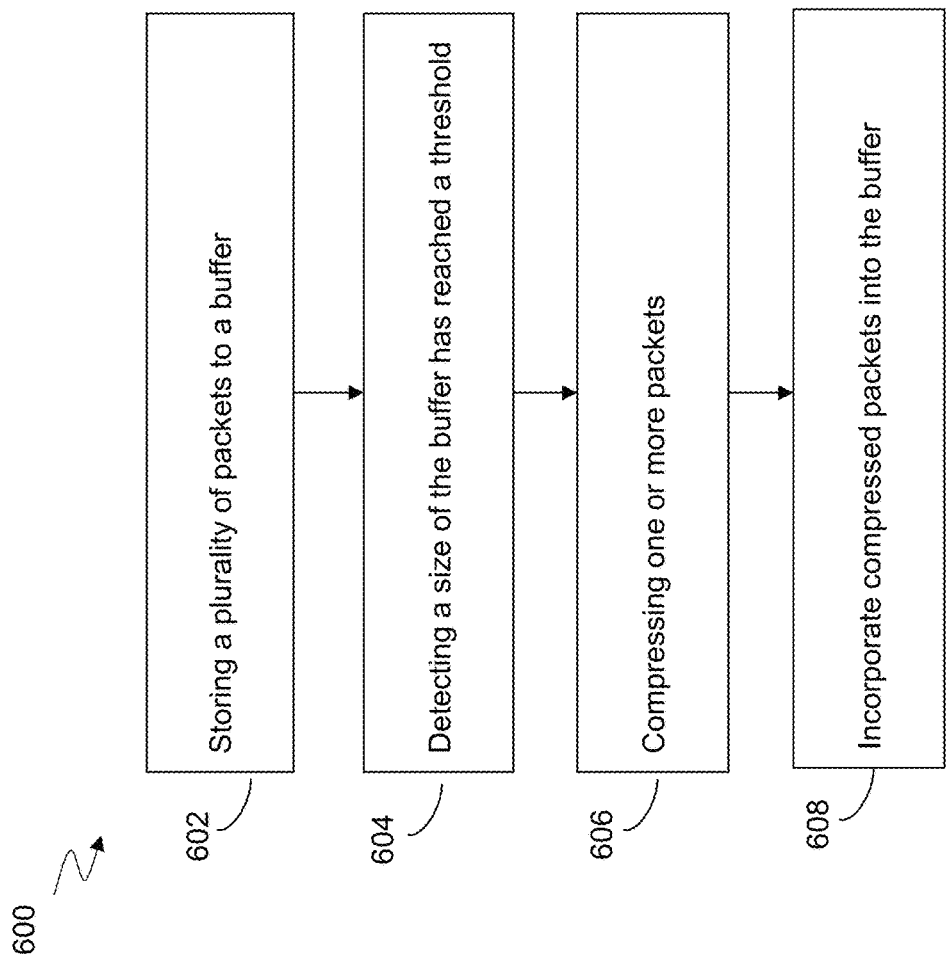
FIG. 6 is a flow diagram of a method for bufferbloat recovery and avoidance.

Referring now to FIG. 6, a method 600 for bufferbloat recovery and avoidance is provided. The method 600 begins at block 602 by storing a plurality of packets to a buffer. A device can be intermediary device to a plurality of client devices and a plurality of servers. The device can receive, transmit, direct, and/or forward one or more packets between the plurality of client devices, the plurality of servers, and/or other forms of computing devices within a network environment.

The device can store the packets into the buffer in an order of how or when they were received. For example, the buffer can store in the packets in the same order they were received based in part on a time corresponding to when the respective packet was received.

The buffer can include one or more threshold values. For example, the buffer can include a first threshold value (e.g., maximum threshold) and a second threshold value (e.g., minimum threshold). The threshold values can correspond to a time value, a time period, size value or length value for the buffer. In some embodiments, the threshold values can be used to identify a portion of the buffer for compression, such as a portion of the buffer between the respective thresholds.

Different buffers can have different threshold values. The device can establish or determine the threshold values based at least in part on a total time period, size, or length of the respective buffer. For example, the device can establish a maximum threshold and a minimum threshold to be values less than the total time period, size, or length of the respective buffer. The threshold values can be determined or established by an administrator of the device.

At block 604, the method 600 can include detecting a size of the buffer has reached a threshold. The device can detect when the size of the buffer has reached the first threshold, the second threshold, or both thresholds. For example, the device can detect when the buffer size crosses the first threshold or maximum threshold. The device can select a portion of the buffer to compress responsive to the detecting the buffer size crosses the first threshold or maximum threshold. The selected portion can correspond to the portion between the first threshold and the second threshold. Thus, the packets or portions of packets between the first threshold and the second threshold can be selected for compression.

The selected portion of the buffer can include a single packet or multiple packets. The device can transmit or forward the multiple packets in the order that the multiple packets are stored in the buffer to the compression module. Thus, the device can maintain the order of the packets before, during, and after compression. The size of the portion selected for compression can vary. For example, the device or an administrator of the device can select or modify the size of the portion selected for compression by establishing or modifying the threshold values (e.g., maximum threshold, minimum threshold) for the respective buffer. In some embodiments, the size of the portion selected for compression can be selected based at least in part on a total size of the buffer.

At block 606, the method 600 can include compressing one or more packets. The compression module can execute a compression algorithm on the selected portion of the buffer. The compression algorithm can have a compression time or duration value corresponding to how long the compression algorithm takes to compress the selected portion of the buffer.

The compression module can compress one or more packets of the plurality of packets stored between the minimum threshold and the maximum threshold and the device can transmit, during compression, at least a portion of one or more different packets of the plurality of packets stored in the buffer below the minimum threshold. For example, the selected portion of the buffer can be transmitted to the compression module. The portion of the buffer before the minimum threshold or not included in the selected portion can be transmitted while the compression module compresses the selected portion. Thus, the client devices, servers, or other forms of computing devices coupled with, communicating with or using the device (e.g., as a router) do not experience an interruption or delay in service during compression. The device can continue to transmit packets in queue in the buffer during compression.

The compression module compresses the selected portion of the buffer by a predetermined ratio (also referred to herein as a compression ratio). The compression ratio can be selected based in part on a total size of the buffer, a difference between the maximum threshold and the minimum threshold, and/or the compression time. For example, the difference between the maximum threshold and the minimum threshold can be referred to herein as a size of the selected portion size (e.g., threshold distance). The size of the selected portion can be compressed or reduced by a factor corresponding to the minimum threshold value minus the compression time. In some embodiments, the compression ratio corresponds to the difference between the maximum threshold and the minimum threshold divided by the minimum threshold minus the compression time. The compression ratio can be established by an administrator of the device.

The compression module can compress different portions of the packet separately. The compression module can identify the different portions of each packet, including the header portion, field portion, and/or payload portion (e.g., data portion). The compression module can compress the different portions of the same packet separately from each other. For example, the compression module can compress a header portion separately from a field portion and/or a payload portion (e.g., data portion). The compression module can compress a field portion separately from a header portion, and/or a payload portion. The compression module can compress a payload portion separately from a header portion and/or a field portion.

The device can identify a first portion of the plurality of packets and a second, different portion of the plurality of packets. The compression module can compress the first portion of the plurality of packets separately from the second portion of the plurality of packets. The different portions of the packets can correspond to different regions of the buffer between the first threshold and the second threshold. In some embodiments, the compression module can compress the first portion by a different compression ratio (e.g., predetermined ratio) than the second portion. For example, the compression module can compress the first portion by a first compression ratio and the compress the second portion by a second, different compression ratio.

The compression module can use various compression techniques to compress the selected portion of the buffer. For example, the compression module can select a type of compression based in part on a type of data stored in the buffer. In some embodiments, an administrator of the device can select the compression technique. The compression technique may be selected based in part on network policies within the network environment the device is operating.

In some embodiments, the compression module may use deduplication techniques on the one or more packets stored in the buffer to reduce the size of the buffer. For example, the compression module can identify duplicate copies of a packet or multiple packets and remove or eliminate the duplicate copies such that at least one copy of the respective packet or packets are stored in the buffer.

At block 608, the compressed packets can be incorporated into the buffer. The compressed plurality of packets can be incorporated at a first point in the buffer. For example, the device can select a point in the buffer to re-incorporate or add the compressed plurality of packets back into the buffer based in part on the compression time. Using the compression time, the device can maintain the order of the compression plurality of packets in the same order as when the corresponding packets were stored in the buffer.

The first point can correspond to a difference between the threshold values and the compression time. For example, the first point can correspond to the minimum threshold minus the compression time (e.g., minimum threshold−compression time). The packets can be added or re-incorporated back into the buffer such that they do not displace packets received during the compression or packets received after the compression completed.

As the packets are added or re-incorporated back into the buffer at the time it took for the compression to take place, the compressed packets are added back to the point or location in the buffer where they would be if the packets hadn't been compressed. Thus, the device can maintain an order of the plurality of packets based on a position of each packet in the buffer responsive to incorporating the compressed plurality of packets. For example, the packets can be compressed in the same order that they were received or stored in the buffer and no packets may be dropped. Thus, during compression, each of the packets stay in the original order or predetermined order.

The method 600 can include decompressing the compressed plurality of packets. For example, the device can be communicatively coupled with a second device through a network environment. The device (or first device that performed the compression) can transmit compression data to the second device. The compression data can include, but not limited to, threshold values (e.g., maximum threshold, minimum threshold), compression time, compression type, compression ratio, and the point or pointer (e.g., first point) that the compressed packets were added back into the buffer.

The second device can be the same as or substantially similar to the first device. The second device can receive the compressed plurality of packets, the compression data, and decompress the plurality of packets in the order of how they were received at the first device and/or originally stored in the buffer on the first device. For example, the second device can include a compression module having a decompression algorithm.

The decompression algorithm can decompress the plurality of packets back to the original time value, size, or length that they were when they were received at the first packet. For example, the second device can use the compression data, such as but not limited to, the pointer data, to identify where the compressed packets are located in the buffer. The decompression algorithm can include a symmetrical algorithm to decompress and arrange the decompressed packets in order. The decompression algorithm can maintain the original order of the plurality of packets and provide the decompressed plurality of packets to one or more client devices and/or one or more servers coupled with the second device.

The compression module can decompress different portions of each of the packets separately. The compression module can identify the different portions of each packet, including the header portion, field portion, and/or payload portion (e.g., data portion). The compression module can decompress the different portions of the same packet separately from each other. For example, the compression module can decompress a header portion separately from a field portion and/or a payload portion (e.g., data portion). The compression module can decompress a field portion separately from a header portion, and/or a payload portion. The compression module can decompress a payload portion separately from a header portion and/or a field portion.

The second device can identify a first portion of the plurality of packets and a second, different portion of the plurality of packets. The compression module can decompress the first portion of the plurality of packets separately from the second portion of the plurality of packets. In some embodiments, the compression module can decompress the first portion by a different compression ratio (e.g., predetermined ratio) than the second portion. For example, the compression module can decompress the first portion by a first decompression ratio and the decompress the second portion by a second, different decompression ratio.

In some embodiments, if the data is not compressible, the device can output the packets in the buffer in the same form (e.g., uncompressed) as they were received. For example, a portion of the buffer can be selected for compression between the maximum threshold and the minimum threshold. The selected portion can be forwarded to the compression module. However, as the data in the selected portion is not compressible, the selected portion is not compressed or reduced and the compression ratio can correspond to a 1:1 ratio. The packets of the selected portion can be added or re-incorporated back into the buffer at a point corresponding to the minimum threshold minus the compression time. As the packets are added back into the buffer at the point they would have been at if they had not been selected for compression, the order of the packets is maintained. The queue size of the buffer is unchanged not including any packets added to the buffer during the compression time. Packets added to the buffer during compression can be added after the maximum threshold value and thus, outside the boundaries or threshold values of the selected portion.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method for compressing a portion of a buffer, the method comprising:
   storing, by a device, a plurality of packets received by the device to a buffer, the buffer configured with a minimum threshold and a maximum threshold;
   detecting, by the device, that a size of the buffer has reached at least the maximum threshold; and
   compressing, by the device, one or more packets of the plurality of packets stored between the minimum threshold and the maximum threshold by a predetermined ratio, while transmitting, during the compressing, at least a portion of one or more packets of the plurality of packets stored in the buffer below the minimum threshold;
   wherein the predetermined ratio corresponds to a difference between the maximum threshold and the minimum threshold and a difference between the minimum threshold and a compression time.

2. The method of claim 1, further comprising selecting for compression the one or more packets in an order that the one or more packets are stored in the buffer between the minimum threshold and the maximum threshold.

3. The method of claim 1, further comprising incorporating the compressed plurality of packets at a first point in the buffer, the first point corresponding to a difference between the minimum threshold and the compression time to compress the one or more packets.

4. The method of claim 3, further comprising maintaining an order of the plurality of packets based on a position of each packet in the buffer responsive to incorporating the compressed plurality of packets.

5. The method of claim 1, further comprising:
   reducing a total time period of the buffer by an amount corresponding to the predetermined ratio.

6. The method of claim 1, further comprising:
   identifying, by the device, a first portion of the plurality of packets and a second portion of the plurality of packets; and
   compressing, by the device, the first portion of the plurality of packets separately from the second portion of the plurality of packets.

7. The method of claim 1, further comprising establishing, by the device, the minimum threshold and the maximum threshold as time periods based on a total time period of the buffer.

8. The method of claim 1, further comprising selecting, by the device, a type of compression based on a type of data in the buffer.

9. The method of claim 1, further comprising:
   identifying, by the device, a header portion of a first packet of the one or more packets and a data portion of the first packet of the one or more packets; and
   compressing, by the device, the header portion of the first packet separately from the data portion of the first packet.

10. The method of claim 1, wherein a second device is configured to receive and decompress the compressed plurality of packets, wherein an order of the compressed plurality of packets is maintained by the second device responsive to decompression.

11. A system for compressing a portion of a buffer, the system comprising:
   a device intermediary to a client and a server, the device configured to:
      store a plurality of packets received by the device to a buffer, the buffer configured with a minimum threshold and a maximum threshold;
      detect that a size of the buffer has reached at least the maximum threshold; and
      compress one or more packets of the plurality of packets stored between the minimum threshold and the maximum threshold by a predetermined ratio, while transmitting, during the compressing, at least a portion of one or more packets of the plurality of packets stored in the buffer below the minimum threshold;
      wherein the predetermined ratio corresponds to a difference between the maximum threshold and the minimum threshold and a difference between the minimum threshold and a compression time.

12. The system of claim 11, wherein the device is further configured to select for compression the one or more packets in an order that the one or more packets are stored in the buffer between the minimum threshold and the maximum threshold.

13. The system of claim 11, wherein the device is further configured to incorporate the compressed plurality of packets at a first point in the buffer, the first point corresponding to a difference between the minimum threshold and the compression time to compress the one or more packets.

14. The system of claim 13, wherein the device is further configured to maintain an order of the plurality of packets based on a position of each packet in the buffer responsive to incorporating the compressed plurality of packets.

15. The system of claim 11, wherein the device is further configured to:
reduce a total time period of the buffer by an amount corresponding to the predetermined ratio.

16. The system of claim 11, wherein the device is further configured to:
identify a first portion of the plurality of packets and a second portion of the plurality of packets; and
compress the first portion of the plurality of packets separately from the second portion of the plurality of packets.

17. The system of claim 11, wherein the device is further configured to establish the minimum threshold and the maximum threshold as time periods based on a total time period of the buffer.

18. The system of claim 11, wherein the device is further configured to select a type of compression based on a type of data in the buffer.

19. The system of claim 11, wherein the device is further configured to:
identify a header portion of a first packet of the one or more packets and a data portion of the first packet of the one or more packets; and
compress the header portion of the first packet separately from the data portion of the first packet.

20. The system of claim 11, wherein a second device is configured to receive and decompress the compressed plurality of packets, wherein an order of the compressed plurality of packets is maintained by the second device responsive to decompression.

* * * * *